United States Patent
Phatak et al.

(10) Patent No.: US 10,684,375 B2
(45) Date of Patent: Jun. 16, 2020

(54) METHOD OF MULTIPLE SATELLITE MEASUREMENT FAILURE DETECTION AND ISOLATION FOR GNSS

(71) Applicant: Samsung Electronics Co., Ltd., Gyeonggi-do (KR)

(72) Inventors: Makarand Phatak, Cupertino, CA (US); Jong-Ki Lee, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 778 days.

(21) Appl. No.: 14/821,323

(22) Filed: Aug. 7, 2015

(65) Prior Publication Data

US 2016/0195617 A1    Jul. 7, 2016

Related U.S. Application Data

(60) Provisional application No. 62/100,015, filed on Jan. 5, 2015.

(51) Int. Cl.
*G01S 19/20* (2010.01)

(52) U.S. Cl.
CPC .................... *G01S 19/20* (2013.01)

(58) Field of Classification Search
CPC ........... G01S 19/08; G01S 19/20; G01S 19/28
USPC ..................................... 342/357.58
See application file for complete search history.

(56) References Cited

U.S. PATENT DOCUMENTS

| | | |
|---|---|---|
| 5,317,514 A | 5/1994 | Bancroft et al. |
| 6,639,549 B2 | 10/2003 | Vanderwerf et al. |
| 6,691,066 B1 | 2/2004 | Brodie |
| 6,798,377 B1 | 9/2004 | Lupash et al. |
| 6,864,836 B1 * | 3/2005 | Hatch ............ G01S 19/20 342/357.58 |
| 7,219,013 B1 | 5/2007 | Young et al. |
| 7,499,710 B2 | 3/2009 | De et al. |
| 8,610,624 B2 | 12/2013 | Savoy |

(Continued)

OTHER PUBLICATIONS https://www.nbaa.org/ops/cns/gps/ (Year: 2011).*

(Continued)

*Primary Examiner* — Vladimir Magloire
*Assistant Examiner* — Helena H Seraydaryan
(74) *Attorney, Agent, or Firm* — The Farrell Law Firm, P.C.

(57) ABSTRACT

Methods for reducing the resources needed to detect and identify faulty pseudorange measurements in a GNSS receiver are described. In a Receiver Autonomous Integrity Monitoring (RAIM) method, a position solution is calculated using a weighted least squares method on measurements from satellites of one or more GNSS constellations. A test statistic is calculated from residuals and a threshold is calculated based on a probability function. If the test statistic is greater than or equal to the threshold, a subset is selected from the set of pseudorange measurements using a metric indicative of possible measurement error. A measurement is selected from the subset using a metric indicative of signal strength or some other metric and discarded from the set of pseudorange measurements. If the number of measurements remaining in the set of pseudorange measurements is greater than five, the method loops back to the step of calculating a position solution.

22 Claims, 2 Drawing Sheets

(56) References Cited

U.S. PATENT DOCUMENTS

| | | | |
|---|---|---|---|
| 8,981,992 B2* | 3/2015 | Riley | G01S 19/20 342/357.23 |
| 2012/0013505 A1 | 1/2012 | Vourc'h et al. | |
| 2013/0249734 A1 | 9/2013 | Najim et al. | |
| 2014/0232595 A1 | 8/2014 | Rife | |

OTHER PUBLICATIONS

Tmazirte, "Fast Multi Fault Detection & Exclusion Approach for GNSS Integrity Monitoring"; IEEE 17th International Conference on Information Fusion. (Year: 2014).*

Azaola-Saenz, Miguel et al., Autonomous Integrity an Error Isotrophy-Based Approach for Multiple Fault Conditions, InsideGNSS, Jan./Feb. 2009, pp. 28-36.

Speidel, Jan et al., Integrity for Aviation: Comparing Future Concepts, InsideGNSS, Jul./Aug. 2013, pp. 54-64.

Kirkko-Jaakkola, M. et al., A RAIM Approach to GNSS Outlier and Cycle Slip Detection Using L1 Carrier Phase Time-Differences 2009 IEEE Workshop on Signal Processing Systems, Oct. 7-9, 2009, pp. 6.

Knight, Nathan L., GNSS Integrity Monitoring for Two Satellite Faults, International Global Navigation Satellite Systems Society, IGNSS Symposium 2009 Dec. 1-3, 2009, pp. 13.

Kuusniemi, Heidi et al., Gnss Signal Reliability Testing in Urban and Indoor Environments, Proceedings of NTM 2004 Conference (Session A2), San Diego, CA, Jan. 26-28, 2004 The Institute of Navigation, pp. 15.

Martineau, A. et al., Performance of Receiver Autonomous Integrity Monitoring (RAIM) for Vertically Guided Approaches, Presented at ENC'GNSS 2008, pp. 11.

Walter, Todd et al., Weighted RAIM for Precision Approach, Stanford University, 1995, pp. 10.

Pullen, Samuel P. et al., A New Approach to GPS Integrity Monitoring Using Prior Probability Models and Optimal Threshold Search Position Location and Navigation Symposium, 1994 IEEE, pp. 8.

Sturza, Mark A., Navigation System Integrity Monitoring Using Redundant Measurements, Navigation: Journal of the Institute of Navigation, vol. 35, No. 4 Winter 1988-89, pp. 19.

Walter, Todd et al., Worldwide Vertical Guidance of Aircraft Based on Modernized GPS and New Integrity Augmentations, Proceedings of the IEEE, vol. 96, No. 12 Dec. 2008, pp. 1918-1935.

Nourdine Ait Tmazirte, et al., Fast Multi Fault Detection & Exclusion Approach for GNSS Integrity Monitoring, Fusion 2014 17th International Conference on Information Fusion, pp. 6.

Tokura, Hiroko et al., Using Multiple GNSS Constellations with Strict Quality Constraints for More Accurate Positioning in Urban Environments Positioning, 2014, 5, pp. 85-96.

Wang, Ershen et al., A Simple and Effective GPS Receiver Autonomous Integrity Monitoring and Fault Isolation Approach 2012 International Conference on Control Engineering and Communication Technology, Copyright 2012 IEEE, pp. 657-660.

Lee, Young C., Receiver Autonomous Integrity Monitoring (RAIM) Capability for Sole-Means GPS Navigation in the Oceanic Phase of Flight, Copyright 1992 IEEE, pp. 464-472.

Lee, Young C., New Advanced RAIM with Improved Availability for Detecting Constellation-wide Faults, Using Two Independent Constellations Copyright 2013 Institute of Navigation, Navigation, Journal of the Institute of Navigation, vol. 60, No. 1, Spring 2013, pp. 71-83.

Zhang, Yun et al., A New Cascade Method for Detecting GPS Multiple Outliers Based on Total Residuals of Observation Equations, Copyright 2012 IEEE, pp. 208-215.

* cited by examiner

METHOD OF MULTIPLE SATELLITE MEASUREMENT FAILURE DETECTION AND ISOLATION FOR GNSS

The present application claims priority under 35 U.S.C. § 119(e) to U.S. Provisional Application No. 62/100,015, entitled "Method of Multiple Satellite Measurement Failure Detection and Isolation for GNSS," which was filed on Jan. 5, 2015, the contents of which are incorporated herein by reference.

BACKGROUND

Field of the Disclosure

The present disclosure relates generally to eliminating faulty measurements in a Global Navigational Satellite System (GNSS) receiver and, more specifically, to eliminating faulty measurements from a set of redundant pseudorange measurements from satellites of one or more constellations in a GNSS receiver using Receiver Autonomous Integrity Monitoring (RAIM) for fault detection and isolation.

Description of the Related Art

Satellite navigational systems provide positional information, normally geo-spatial, to earth-bound receivers. Each system has its own constellation of satellites orbiting the Earth, and in order to calculate its position a receiver in that system uses the satellites "in view" (i.e., in the sky above) of that system's constellation. Generally, the larger the number of satellites in view, the more accurate the calculation of the receiver's position will be. "Global Navigational Satellite Systems (GNSS)" is often used as the generic term for such systems, even though such navigational satellite systems include, e.g., regional and augmented systems—i.e., systems that are not truly "global." The term "GNSS," as used herein, covers any type of navigational satellite system, global or not, unless expressly indicated otherwise.

As the electronics for GNSS receivers have gotten smaller, and the positional calculations have become more accurate, the use of GNSS functions has become ubiquitous in consumer and other electronic devices, from cellular telephones to automobiles. As the number of uses for GNSS receivers has grown substantially and is still growing, the number of GNSS systems, both planned and presently operational, is also growing. The widely-known, widely-used, and truly global Global Positioning System (GPS) has been joined by two other global systems, the GLObalnaya NAvigatsionnaya Sputnikovaya Sistema (GLONASS) and Beidou, and will be joined by the Galileo system—each of which has, or will have, its own constellation of satellites orbiting the globe. Regional systems (those that are not global, but intended to cover only a certain region of the globe) include the Quasi-Zenith Satellite System (QZSS) and the Indian Regional Navigational Satellite System (IRNSS) which is currently being developed. Augmented systems (which are normally regional as well, and which "augment" with messages from ground-based stations and/or additional navigational aids) include Wide Area Augmentation System (WAAS), European Geostationary Navigation Overlay Service (EGNOS), Multi-functional Satellite Augmentation System (MSAS), and GPS Aided Geo Augmented Navigation (GAGAN).

A multi-constellation GNSS receiver receives signals from more than one satellite constellation (e.g., two or more of GPS, Galileo, GLONASS, Beidou, and/or augmentation system constellations) and provides much greater accuracy because the number of unblocked satellites, sometimes referred to as satellite/space vehicles (SVs), overhead at any time from several constellations is always greater than the number of SVs overhead from a single constellation. However, with greater accuracy comes greater complexity and new problems.

In GNSS systems, Receiver Autonomous Integrity Monitoring (RAIM) is used to detect and isolate problematic satellite measurements which can cause large errors in positioning calculations. RAIM, which is "autonomous" because the GNSS receiver can perform RAIM without additional signals or input (unlike using Satellite-based Augmentation Systems (SBAS) and/or Ground Based Augmentation Systems (GBAS)), checks the integrity of a computed GNSS solution and then, if that integrity check detects a problem (or fault), determines which measurement/SV is at fault and discards or eliminates (or "isolates") it from the current iteration of computing the GNSS solution. A fault is typically an error of large magnitude in measurement which, in turn, causes an error of large magnitude in the computed GNSS solution. The magnitude of error in a fault depends on the receiver accuracy requirements and can have a variety of causes, such as error in data transmitted by SV, signal decoding error, multi-path error in measurement, etc. There are many different implementations of RAIM, both in use and proposed, with less or more steps, different algorithms for the integrity check, and different procedures for isolating the faulty measurement/SV.

RAIM requires a certain number of satellites in view to work, particularly if faulty measurements/SVs are going to be discarded. Since only four satellites are required for 3 dimensional (3D) positioning and clock bias, any measurements from more than four satellites are "redundant" measurements and often all of the measurements in a set of 5 or more are referred to jointly as "redundant." RAIM requires 5 measurements to detect a problem (or fault) and more than 5 measurements to isolate which measurement/SV is at fault, by using this redundancy to check for consistency (and thus faults) among the set of pseudorange measurements.

Traditional RAIM implementations assume only one fault in a set of measurements. However, the larger number of available satellites and thus the larger number of measurements being performed in, for example, a multi-constellation GNSS receiver, necessarily results in more faults, greatly increasing the occurrence of more than one fault in one set of measurements. Moreover, more than one faulty measurement is typically observed in a high multi-path or so called "urban canyon" environment, e.g., in the midst of tall buildings. Most implementations of RAIM use exhaustively repetitive combinatorial searches to determine which of the measurements/SVs is faulty, once a single fault is detected. The amount of additional resources needed to detect more than one fault in a set of measurements using these exhaustively repetitive combinatorial searches is quite costly. As the frequency of multiple faults in a set of measurements increases, more and more resources of the GNSS receiver will be used to detect them.

Thus, there is a need for methods and apparatuses that reduce the resources needed to both detect and identify faulty measurements in a GNSS receiver.

SUMMARY

Accordingly, the present disclosure has been made to address at least the problems and/or disadvantages described above and to provide at least the advantages described below. In one aspect of the present disclosure, a sub-optimal but efficient method for multiple fault detection and isolation (MFDI) is provided. In another aspect of the present disclosure, the exhaustive combinatorial approach to detecting/identifying faults is eliminated. In yet another aspect of the present disclosure, a single metric is used to select a measurement to be discarded from a set of measurements in which a fault has been detected. In yet another aspect of the present disclosure, a first metric is used to select a subset from a set of measurements in which a fault has been detected and a second metric is used to select one measurement from the subset to be discarded. In still another aspect of the present disclosure, an error metric is used to select two measurements as possibly faulty measurements from a set of measurements in which a fault has been detected and a signal strength metric is used to select one of the two measurements to be discarded.

In accordance with an aspect of the present disclosure, a method for a Global Navigational Satellite System (GNSS) receiver includes taking a set of pseudorange measurements of signals from each of a plurality of satellites; calculating, using a least squares method, a position solution for the GNSS receiver using the set of pseudorange measurements; calculating residuals for each of the pseudorange measurements in the set of pseudorange measurements; calculating a test statistic for the set of pseudorange measurements based at least on the calculated residuals; calculating a threshold for the test statistic based at least on a predetermined probability distribution function; determining if the test statistic is greater than or equal to the threshold; and, if the test statistic is greater than or equal to the threshold, selecting, according to a metric indicative of possible measurement error, a subset of measurements from the set of pseudorange measurements; selecting, according to a metric indicative of signal strength, a measurement to discard from the subset of measurements; discarding the selected measurement from the set of pseudorange measurements; determining if the number of pseudorange measurements remaining in the set of pseudorange measurements is greater than five; and if the number of pseudorange measurements remaining in the set of pseudorange measurements is greater than five, returning to the calculating a position solution step.

In accordance with another aspect of the present disclosure, a method for a Global Navigational Satellite System (GNSS) receiver includes taking a set of pseudorange measurements of signals from each of a plurality of satellites; calculating a position solution for the GNSS receiver using the set of pseudorange measurements; performing an integrity check on the position solution; and, if the position solution fails the integrity check, selecting, according to a first metric, a subset of measurements from the set of pseudorange measurements; selecting, according to a second metric, a measurement to discard from the subset of measurements; discarding the selected measurement from the set of pseudorange measurements; determining if the number of pseudorange measurements remaining in the set of pseudorange measurements is greater than a predetermined number; and if the number of pseudorange measurements remaining in the set of pseudorange measurements is greater than a predetermined number, returning to the calculating step.

In accordance with yet another aspect of the present disclosure, a portable device capable of receiving Global Navigational Satellite System (GNSS) signals includes a GNSS receiver; at least one non-transitory computer-readable medium; and one or more processors, wherein the one or more processors, when executing a set of instructions stored in the at least one non-transitory computer-readable medium, controls the portable device to perform the steps of: taking a set of pseudorange measurements of signals from each of a plurality of satellites; calculating a position solution for the portable device using the set of pseudorange measurements; performing an integrity check on the position solution; and, if the position solution fails the integrity check: selecting, according to a first metric, a subset of measurements from the set of pseudorange measurements; selecting, according to a second metric, a measurement to discard from the subset of measurements; discarding the selected measurement from the set of pseudorange measurements; determining if the number of pseudorange measurements remaining in the set of pseudorange measurements is greater than a predetermined number; and, if the number of pseudorange measurements remaining in the set of pseudorange measurements is greater than a predetermined number, returning to the calculating step.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may comprise one or more elements. An element may comprise any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in this specification are not necessarily all referring to the same embodiment.

Embodiments of the present disclosure provide a sub-optimal method for multiple fault detection and isolation (MFDI) of measurements without using exhaustive combinatorial methods. While the method is sub-optimal (in comparison to the more accurate but heavily resource-intensive combinatorial methods), the quickly obtained results are sufficiently accurate and are provided at greatly reduced expense in terms of resources, whether measured in terms of hardware (e.g., by the components needed to perform the combinatorial methods), software (e.g., by the processor and bus time needed to perform the combinatorial methods), and power.

Embodiments of the present disclosure provide additional checks to isolate faults. These checks take into account other factors, such as noise and signal strength, in isolating faulty measurements. One embodiment compares the measurements which indicate the greatest possibility of fault for their similarity (or "closeness") in regards to a certain metric and then isolates a measurement for exclusion based on additional criteria, such as signal power, elevation angle, time in tracking, and/or some other parameter. According to the embodiments of the present disclosure, large position errors are reduced.

Figure 1:
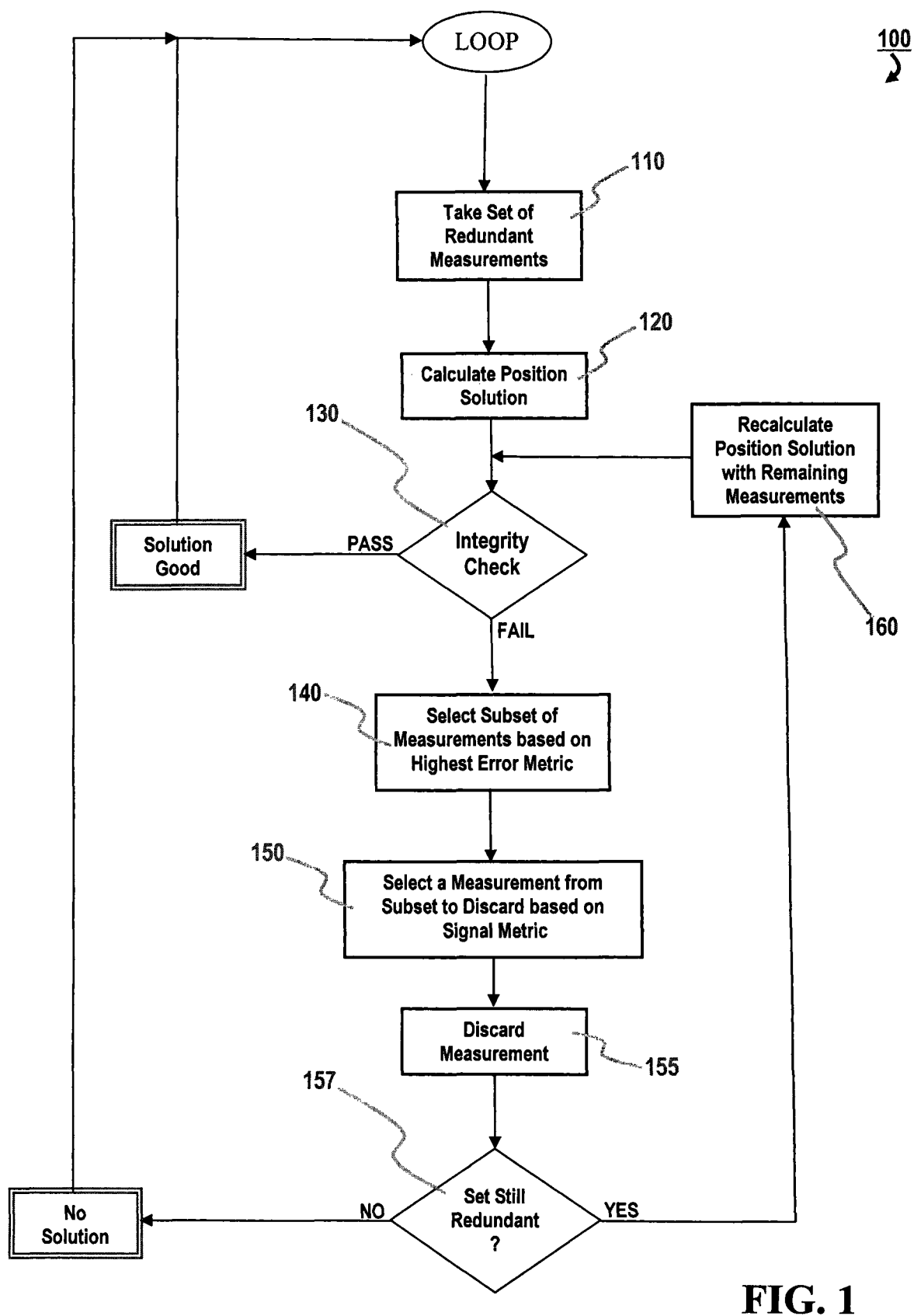
FIG. 1 is a generalized and simplified representation of a method according to embodiments of the present disclosure.

FIG. 1 is a generalized and simplified representation of a method 100 according to embodiments of the present disclosure. LOOP is at the top of FIG. 1, indicating that this method is continuously repeating in a GNSS receiver. After a set of redundant pseudorange measurements is taken in step 110, a position solution is calculated in step 120, concerning which an integrity check is performed in step 130. If the solution (and/or the set of redundant pseudorange measurements) passes the integrity check in step 130, the solution is good, and the method loops back to the start.

If the solution (and/or the set of redundant pseudorange measurements) fails the integrity check in step 130, it indicates there are one or more faults in the set of redundant pseudorange measurements. In conventional RAIM systems, the exhaustive combinatorial procedure would be used at this point to determine what measurement(s) is/are faulty. In FIG. 1, a two-part procedure is used to determine which measurement to discard as faulty. In step 140, a subset of measurements is selected from the set of all redundant pseudorange measurements. In one embodiment described below, this subset contains two measurements. The measurements are selected for the subset based on a metric indicating a greater likelihood of error, that is, a metric indicating that the measurements are highly likely to be faulty. A number of metrics could be used, as discussed further below. In step 150, a measurement is selected from the subset to be discarded from the whole set of measurements. The measurement to be discarded is selected based on a metric indicating the relative strength or weakness of the received signal corresponding to the measurement. A number of metrics could be used for step 150, as discussed further below, such as the carrier-to-noise density ratio $C/N_0$ of the signal, the elevation angle of the SV, the time in track of the signal, etc. The measurement selected based on the metric in step 150 is discarded in step 155. In step 157, it is determined whether the set of remaining measurements is sufficiently redundant. If so, the position solution is recalculated using the set of remaining measurements in step 160. If not, there is no solution for this epoch and the method starts again. The loop of steps 130-140-150-155-157-160-130 continues until either there is a good solution (i.e., it passes the integrity check in step 130) or the set of measurements is too small (i.e., the set of measurements are no longer sufficiently redundant in step 157).

In FIG. 1, only candidate subset selection (step 140) and candidate elimination (step 150) are used for fault detection and isolation. In other embodiments, candidate subset selection using an error metric and candidate elimination using a signal metric may be used only to reduce the number of measurements sufficiently so that other, more accurate methods for fault isolation and detection could be used once (and if) the number of remaining measurements is small enough to do so without undue resource usage. Other variations on using candidate subset selection according to a first metric and candidate elimination according to a second metric would also be possible, as would be understood by one of ordinary skill in the art.

Figure 2:
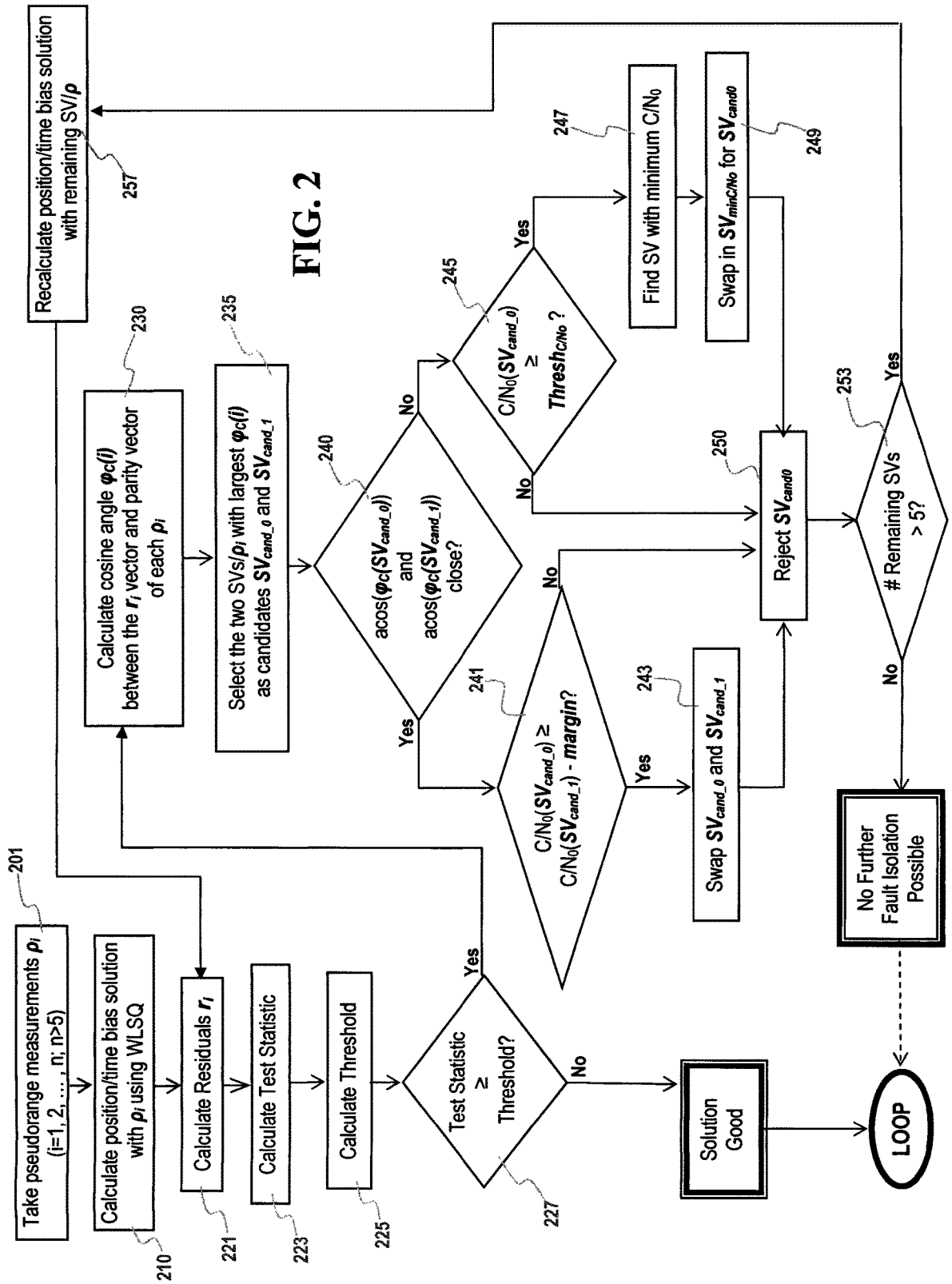
FIG. 2 is a flowchart of an embodiment of the present disclosure, which uses RAIM least squares epoch-by-epoch positioning for fault detection and isolation.

FIG. 2 is a flowchart of an embodiment of the present disclosure, which uses RAIM least squares epoch-by-epoch positioning for fault detection and isolation.

In step 201, n number of pseudorange measurements $\rho_i$ are taken, where n is the number of SVs currently overhead. As previously discussed, n must be greater than 5 for there to be sufficient redundancy for RAIM. This embodiment uses a Weighted Least Squares method (WLSQ) in step 210 to calculate a position and time bias solution for the GNSS receiver's current location with the n pseudorange measurements $\rho_i$. Weighted least squares methods use weighting of individual pseudorange measurements $\rho_i$. to improve fault detection as well as the solution. See, e.g., Walter, T., and Enge, P., "Weighted RAIM for Precision Approach," *Proceedings of the $8^{th}$ Int'l Technical Meeting of the Satellite Division of the Institute of Navigation (ION GPS-95)*, Palm Springs, Calif., pp. 1995-2004, Sep. 12-15, 1995 (hereinafter "Walter & Enge", the contents of which are incorporated herein by reference). WLSQ iteratively solves linearized equations involving n pseudorange measurements $\rho_i$ in order to calculate the solution in step 210. As would be understood by one of ordinary skill in the art, other methods could be used, with appropriate modifications suitable for those other methods, such as solution separation RAIM.

Next, fault detection is performed in steps 221-223-225-227. As discussed above, fault detection is based on an assumed consistency between the redundant pseudorange measurements $\rho_i$—if there is a large enough inconsistency, a fault is indicated. In step 221, residual vectors r of each of the n pseudorange measurements $\rho_i$ are calculated. Each residual vector $r_i$ represents the difference between a pseudorange measurement $\rho_i$ and its estimated value for the same SV (sometimes referred to as the a posteriori value, or the value predicted by, e.g., a model). In step 223, a test statistic is calculated from the residuals calculated in step 221, in this case, by calculating and adding together the weighted sum-of-squares of each of the residual vectors. In step 225, a threshold is calculated from an inverse $\chi^2$ probability function corresponding to an estimated error, which is a function of the redundant number of measurements, i.e., the number n of SVs used, and the number of unknowns (such as the three dimensions of position and the receiver clock bias). The details of residual, test statistic, and threshold calculations, and the possible variations in each, are known to one of ordinary skill in the art and need not be explained here. See, e.g., Walter & Enge; U.S. Pat. No. 8,610,624 to Savoy; U.S. Pat. No. 6,864,836 to Hatch et al.; U.S. Pat. Pub. No. 2013/0249734; U.S. Pat. No. 6,691,066 to Brodie; U.S. Pat. No. 7,219,013 to Young et al.; U.S. Pat. Pub. No. 2014/0232595; and U.S. Pat. No. 6,639,549 to Vanderwerf et al., each of which is incorporated by reference in its entirety.

In step 227, the test statistic is compared with the threshold. If the test statistic is less than the threshold, no fault is detected and the solution is assumed to be good; if the test statistic is greater than or equal to the threshold, a fault has been detected. Because of the use of the $\chi^2$ probability function in the calculations (based on its assumed fit with the test statistic), this test is sometimes referred to as the "chi-square test".

If a fault is detected in step 227 (i.e., if the test statistic≥the threshold), fault isolation is performed in accordance with an embodiment of the present disclosure, consisting of two phases: candidate subset selection and candidate elimination.

Candidate subset selection is performed in steps 230 and 235 and, in this embodiment, the subset comprises only two fault candidates. In step 230, the cosine angle $\varphi_C$ of each pseudorange measurement $\rho_i$ is calculated. Cosine angle $\varphi_C$ is the cosine similarity $\cos\theta(i)$ between a vector comprised of residual $r_i$ values for each pseudorange measurement $\rho_i$ and a vector comprised of their corresponding parity values generated from the matrix used in the WLSQ method, where the cosine similarity $\cos\theta$ between vector $X=(x_1, x_2, x_3, \ldots, x_n)$ and $Y=(y_1, y_2, y_3, \ldots, y_n)$ is defined as:

$$\cos\theta = \frac{X \cdot Y}{\|X\|\|Y\|} = \frac{\sum_{i=1}^{n} x_i y_i}{\sqrt{\sum_{i=1}^{n} x_i^2} \sqrt{\sum_{i=1}^{n} y_i^2}} \qquad \text{Equation (1)}$$

As such, the cosine angle $\varphi_C$ is a measure of orientation rather than magnitude. In step 235, the two SVs/$\rho_i$ with the largest cosine angles are selected as candidates $SV_{cand\_0}$ and $SV_{cand\_1}$. As discussed above, the SV with the largest cosine angle $\varphi_C$ corresponds to the SV whose parity vector subtends the least angle to the residual vector or, equivalently, the SV whose parity vector is aligned most with the residual vector.

Candidate elimination is performed in steps 240-241-243-245-247-249-250. In step 240, it is determined whether the inverse of cosine angle $\varphi_C$ of candidate $SV_{cand\_0}$ is close in value to the inverse of cosine angle $\varphi_C$ of candidate $SV_{cand\_1}$. In this embodiment, less than 10° in angular separation is considered close, but different values could be used as the threshold according to the implementation and current situation (e.g., it could change according to the current set of measurements, or measurement residuals, etc.). To put it simply, if the two candidates $SV_{cand\_0}$ and $SV_{cand\_1}$ are close, it indicates that they may be somewhat close in their quantity of error as well.

Broadly speaking, after it is determined whether $SV_{cand\_0}$ and $SV_{cand\_1}$ are close in error in step 240, the carrier-to-noise density ratios C/N$_0$s of candidate $SV_{cand\_0}$ and $SV_{cand\_1}$ are considered in picking which candidate to discard. In general, the larger the C/N$_0$, the better the signal. Thus, C/N$_0$ is an indirect indicator of which candidate is more likely to have a fault—i.e., the candidate with a relatively high C/N$_0$ is less likely to be the measurement fault.

If it is determined that $SV_{cand\_0}$ and $SV_{cand\_1}$ are close in error in step 240 (i.e., a $\cos(\varphi_C(SV_{cand\_0}))$ and a $\cos(\varphi_C(SV_{cand\_1}))$ are close), the method continues to step 241, in which the C/N$_0$s of $SV_{cand\_0}$ and $SV_{cand\_1}$ are compared. More specifically, it is determined in step 241 whether the C/N$_0$ of $SV_{cand\_0}$ is greater than or equal to the value of the C/N$_0$ of $SV_{cand\_1}$ subtracted by the value margin. The value of margin is a free parameter in the method, and can be fixed or variable based on, e.g., how large C/N$_0$ of $SV_{cand\_0}$ is; in this embodiment, the typical value of margin ranges from 3 to 5. If, in step 241, the C/N$_0$ of $SV_{cand\_0}$ is greater than or equal to the value of the C/N$_0$ of $SV_{cand\_1}$ subtracted by the value margin (i.e., C/N$_0$($SV_{cand\_0}$)≥C/N$_0$($SV_{cand\_1}$)−margin), $SV_{cand\_0}$ has a relatively large C/N$_0$, and thus should be retained (for the moment). Thus, in step 243, the candidates are swapped—i.e., the previous $2^{nd}$ candidate $SV_{cand\_1}$ becomes the new first candidate $SV_{cand\_0}$, and vice-versa. Then the new $SV_{cand\_0}$ is rejected in step 250. If, in step 241, the C/N$_0$ of $SV_{cand\_0}$ is less than the value of the C/N$_0$ of $SV_{cand\_1}$ subtracted by the value margin, $SV_{cand\_0}$ remains the first candidate and is rejected in step 250.

If it is determined that $SV_{cand\_0}$ and $SV_{cand\_1}$ are not close in error in step 240, the method continues to step 245, in which it is determined whether the C/N$_0$ of $SV_{cand\_0}$ is greater than or equal to Thresh$_{C/N_0}$. Thresh$_{C/N_0}$ is another free parameter of the method and, in this embodiment, is equal to 33 dB-Hz, although other values for Thresh$_{C/N_0}$ may be more or less appropriate depending on the implementation of the method. If the C/N$_0$ of $SV_{cand\_0}$ is less than Thresh$_{C/N_0}$ in step 245, the C/N$_0$ of $SV_{cand\_0}$ is not large enough to consider retaining it, and thus $SV_{cand\_0}$ is rejected in step 250. If the C/N$_0$ of $SV_{cand\_0}$ is greater than or equal to Thresh$_{C/N_0}$ in step 245, the C/N$_0$ of $SV_{cand\_0}$ is large enough to retain $SV_{cand\_0}$ despite the indication of a possible fault. Accordingly, another SV must be selected as the new $SV_{cand\_0}$ and, in step 247, the SV with the lowest C/N$_0$ is found and swapped in for the old $SV_{cand\_0}$ in step 249, resulting in its rejection in step 250.

Although C/N$_0$ is used in this embodiment to select the candidate SV to be discarded, other criteria may be used in other embodiments. For example, the elevation angle could be used, e.g., the SV which is lowest in the sky would be discarded, because, inter alia, the signals from such SVs are more likely to be affected by multi-path issues. As another example, the time over which the SV signal has been tracked could be used. The less time that the SV has been tracked, the less accurate measurements based on the SV's signals are, because the measurement error decreases over time. In some embodiments, a combination of C/N$_0$, elevation angle, and time in track could be used in deciding which candidate SV to discard. In other embodiments, different criteria may be used.

After the finally selected $SV_{cand\_0}$ is rejected (i.e., after its pseudorange measurement $\rho_{SVcand\_0}$ are removed from the set) in step 250, it is determined whether more than 5 SVs remain in the set of overhead SVs (and thus remain in the set of pseudorange measurements $\rho_i$) in step 253. If not (i.e., # Remaining SVs≤5), fault isolation can no longer continue because of the lack of the minimal required redundancy in the set of measurements. At this point, no solution could be accepted for this epoch and the process simply starts over in the next epoch. What is done at this point depends on the implementation and environment of the particular GNSS receiver. Moreover, different actions may be performed at this point depending on current conditions, etc. Accordingly, the line after the "No Further Fault Isolation Possible" box in FIG. 2 is dotted. In any event, if there are more than 5 SVs/pseudorange measurements $\rho_i$ remaining in step 253 (i.e., # Remaining SVs>5), the process begins again in step 257, by recalculating the solution using WLSQ, i.e., by iteratively solving linearized equations with the remaining pseudorange measurements $\rho_i$, as was done in step 210. The method continues, as before, at step 221.

As shown in U.S. Prov. App. No. 62/100,015, from which this application claims priority and the contents of which are incorporated herein by reference, simulations using the method in FIG. 2 showed a substantial reduction in position error. In one case, an initial solution using 10 measurements had a position error of around 100 meters, while the final solution using only 8 measurements (two having been discarded according to the method) had only a 13 meter position error. In a second case, an initial solution starting with 12 measurements had a position error of around 250 meters, while the final solution using only 8 measurements had only a 33 meter position error. In a third case, an initial solution using 10 measurements had a position error of around 94 meters, while the final solution using only 8 measurements had only a 5 meter position error.

As would be understood by one of ordinary skill in the art, many of the details of the embodiment explained in reference to FIG. 2 could be varied (or, in some cases, changed completely) while still remaining in the basic idea as represented by FIG. 1. For example, FIG. 2 uses WLSQ to calculate the solution and support fault detection/isolation, but other embodiments could be implemented using other least square methods, such as total least squares, or using other methods besides least squares, such as an analytic method. Similarly, differently-calculated and/or differently-defined test statistics and thresholds could be used in other embodiments. As another example, other embodiments could use additional or other metrics besides cosine angle for candidate selection. One example of an alternative metric is using the measurement residual divided by a scale factor, where the scale factor is based on the diagonal vector of a matrix derived from the matrix used in weighted least squares method. Similarly, the metric(s) and/or the threshold/standards for selection could vary with current conditions/measurements. In other embodiments, the candidate subset may have more than two candidates, or the number of candidates in the subset could vary with current conditions/measurements.

As discussed above, other embodiments could use additional or other metrics besides $C/N_0$ for candidate elimination. Moreover, as would be understood by one of ordinary skill in the art, different criteria and comparisons involving $C/N_0$ or other metrics could be used in other embodiments (rather than the criteria/comparisons in steps 241, 245, and 247 of FIG. 2).

Depending on the embodiment of the present disclosure, steps and/or operations in accordance with the present disclosure may occur in a different order, or in parallel, or concurrently for different epochs, etc., in different embodiments, as would be understood by one of ordinary skill in the art. Similarly, as would be understood by one of ordinary skill in the art, FIG. 2 is a simplified representation of the actions performed, and real-world implementations may perform the actions without making "decisions" as are made in steps 227, 240, 241, 245, and 253. Similarly, as a simplified representation, FIG. 2 does not show other required steps as these are known and understood by one of ordinary skill in the art and not pertinent and/or helpful to the present description.

Depending on the embodiment, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person or remain in close proximity to the person.

Depending on the embodiment, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware (or embedded software), hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the present disclosure have been shown and described herein, it will be understood by those of ordinary skill in the art that various changes in form and details may be made therein without departing from the spirit and scope of the present disclosure—i.e., the invention is not limited to any embodiments described herein, but is defined by the appended claims and their equivalents.

What is claimed is:

1. A method for a Global Navigational Satellite System (GNSS) receiver to discard one or more pseudorange measurements, comprising:
   generating, by the GNSS receiver, a set of pseudorange measurements from signals from each of a plurality of satellites;
   calculating, by the GNSS receiver using a least squares method, a position solution for the GNSS receiver using the set of pseudorange measurements;
   calculating, by the GNSS receiver, residuals for each of the pseudorange measurements in the set of pseudorange measurements;
   calculating, by the GNSS receiver, a test statistic for the set of pseudorange measurements based at least on the calculated residuals;
   calculating, by the GNSS receiver, a threshold for the test statistic based at least on a predetermined probability distribution function;
   determining, by the GNSS receiver, if the test statistic is greater than or equal to the threshold; and
   if the test statistic is greater than or equal to the threshold, the GNSS receiver performs the steps of:
   selecting, according to a first metric indicative of measurement error, a subset of at least two measurements from the set of pseudorange measurements for potential discarding of the at least two measurements;
   selecting, according to a second metric indicative of signal strength, a measurement to discard from the subset of measurements;
   discarding the selected measurement from the set of pseudorange measurements;
   determining if the number of pseudorange measurements remaining in the set of pseudorange measurements is greater than five; and
   if the number of pseudorange measurements remaining in the set of pseudorange measurements is greater than five, returning to the step of calculating a position solution.

2. The method of claim 1, wherein the method comprises a Receiver Autonomous Integrity Monitoring (RAIM) method.

3. The method of claim 1, wherein calculating a position solution uses a weighted least squares method.

4. The method of claim 1, wherein the first metric indicative of measurement error comprises, for each pseudorange measurement, the cosine similarity between its residual vector and its parity vector.

5. The method of claim 1, wherein the second metric indicative of signal strength comprises carrier to noise density of the signal corresponding to each pseudorange measurement.

6. The method of claim 1, wherein the probability distribution function comprises a $\chi^2$ probability function.

7. A method for a Global Navigational Satellite System (GNSS) receiver to discard one or more pseudorange measurements, comprising:
   generating, by the GNSS receiver, a set of pseudorange measurements from signals from each of a plurality of satellites;
   calculating, by the GNSS receiver, a position solution for the GNSS receiver using the set of pseudorange measurements;
   performing, by the GNSS receiver, an integrity check on the position solution; and
   if the position solution fails the integrity check, the GNSS receiver performs the steps of:
   selecting, according to a first metric, a subset of at least two measurements from the set of pseudorange measurements for potential discarding of the at least two measurements;
   selecting, according to a second metric, a measurement to discard from the subset of measurements;
   discarding the selected measurement from the set of pseudorange measurements;
   determining if the number of pseudorange measurements remaining in the set of pseudorange measurements is greater than a predetermined number; and
   if the number of pseudorange measurements remaining in the set of pseudorange measurements is greater than a predetermined number, returning to the calculating step.

8. The method of claim 7, wherein the plurality of satellites is from more than one GNSS constellation.

9. The method of claim 7, wherein the first metric comprises an indicator of possible error of each pseudorange measurement.

10. The method of claim 9, wherein the first metric comprises, for each pseudorange measurement vector, the cosine similarity between its residual vector and its parity vector.

11. The method of claim 7, wherein the second metric comprises an indicator of signal strength.

12. The method of claim 11, wherein the second metric comprises carrier to noise density of the signal corresponding to each pseudorange measurement.

13. The method of claim 7, wherein the predetermined number comprises a minimum number of pseudorange measurements to perform Receiver Autonomous Integrity Monitoring (RAIM).

14. The method of claim 7, wherein the predetermined number comprises five.

15. The method of claim 7, further comprising:
   generating residuals from the set of pseudorange measurements and the position solution calculations.

16. The method of claim 15, wherein selecting a subset of measurements comprises:
   selecting, according to the first metric, a subset of measurements from the set of pseudorange measurements using values derived from the generated residuals.

17. The method of claim 15, wherein performing the integrity check comprises:
   determining if a test statistic is greater than or equal to a threshold,
   wherein the test statistic is generated from at least the generated residuals.

18. A portable device capable of receiving Global Navigational Satellite System (GNSS) signals, comprising:
   a GNSS receiver;
   at least one non-transitory computer-readable medium; and
   one or more processors, wherein the one or more processors, when executing a set of instructions stored in the at least one non-transitory computer-readable medium, controls the portable device to perform the steps of:
   taking a set of pseudorange measurements of signals from each of a plurality of satellites;
   calculating a position solution for the portable device using the set of pseudorange measurements;
   performing an integrity check on the position solution; and if the position solution fails the integrity check:
  selecting, according to a first metric, a subset of at least two measurements from the set of pseudorange measurements for potential discarding of the at least two measurements;
  selecting, according to a second metric, a measurement to discard from the subset of measurements;
  discarding the selected measurement from the set of pseudorange measurements;
  determining if the number of pseudorange measurements remaining in the set of pseudorange measurements is greater than a predetermined number; and
  if the number of pseudorange measurements remaining in the set of pseudorange measurements is greater than a predetermined number, returning to the calculating step.

19. The portable device of claim 18, wherein the one or more processors, when executing a set of instructions stored in the at least one non-transitory computer-readable medium, controls the portable device to perform the step of:
  generating residuals from the set of pseudorange measurements and the position solution calculations.

20. The portable device of claim 19, wherein values derived from the generated residuals are used in selecting the subset of measurements.

21. The portable device of claim 19, wherein the one or more processors, when executing a set of instructions stored in the at least one non-transitory computer-readable medium, controls the portable device to perform the step of:
  generating a test statistic from at least the generated residuals,
  wherein performing the integrity check comprises determining if the test statistic is greater than or equal to a threshold.

22. A portable device capable of receiving Global Navigational Satellite System (GNSS) signals, comprising:
  a GNSS receiver;
  at least one non-transitory computer-readable medium; and
  one or more processors, wherein the one or more processors, when executing a set of instructions stored in the at least one non-transitory computer-readable medium, controls the portable device to perform the steps of:
  taking a set of pseudorange measurements of signals from each of a plurality of satellites;
  calculating, using a least squares method, a position solution for the GNSS receiver using the set of pseudorange measurements;
  calculating residuals for each of the pseudorange measurements in the set of pseudorange measurements;
  calculating a test statistic for the set of pseudorange measurements based at least on the calculated residuals;
  calculating a threshold for the test statistic based at least on a predetermined probability distribution function;
  determining if the test statistic is greater than or equal to the threshold; and
  if the test statistic is greater than or equal to the threshold:
  selecting, according to a first metric indicative of possible measurement error, a subset of at least two measurements from the set of pseudorange measurements for potential discarding of the at least two measurements;
  selecting, according to a second metric indicative of signal strength, a measurement to discard from the subset of measurements;
  discarding the selected measurement from the set of pseudorange measurements;
  determining if the number of pseudorange measurements remaining in the set of pseudorange measurements is greater than five; and
  if the number of pseudorange measurements remaining in the set of pseudorange measurements is greater than five, returning to the step of calculating a position solution.

* * * * *